(12) United States Patent
Sugihara et al.

(10) Patent No.: US 9,804,390 B2
(45) Date of Patent: Oct. 31, 2017

(54) VIRTUAL IMAGE OBSERVATION OPTICAL SYSTEM AND LIGHT GUIDE PRISM

(71) Applicant: OLYMPUS CORPORATION, Tokyo (JP)

(72) Inventors: Ryohei Sugihara, Tokyo (JP); Shinya Takahashi, Tokyo (JP); Yoichi Iba, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 161 days.

(21) Appl. No.: 14/642,916

(22) Filed: Mar. 10, 2015

(65) Prior Publication Data
US 2015/0260988 A1    Sep. 17, 2015

(30) Foreign Application Priority Data

Mar. 11, 2014  (JP) ................. 2014-047849

(51) Int. Cl.
| | | |
|---|---|---|
| *G02B 27/14* | (2006.01) | |
| *G02B 27/01* | (2006.01) | |
| *G02B 27/00* | (2006.01) | |
| *G02B 5/04* | (2006.01) | |

(52) U.S. Cl.
CPC ..... *G02B 27/0101* (2013.01); *G02B 27/0018* (2013.01); *G02B 27/0149* (2013.01); *G02B 27/0172* (2013.01); *G02B 5/04* (2013.01); *G02B 2027/0161* (2013.01)

(58) Field of Classification Search
CPC ............ G02B 27/0172; G02B 27/0101; G02B 2027/0178; G02B 2027/0132; G02B 2027/011

USPC ................ 359/629–633, 636, 639–640, 618, 359/831–837
See application file for complete search history.

(56) References Cited

U.S. PATENT DOCUMENTS

| | | | | |
|---|---|---|---|---|
| 2006/0017834 A1* | 1/2006 | Konno | ............... | G02B 13/0025 348/335 |
| 2010/0321781 A1* | 12/2010 | Levola | ............... | G02B 27/0081 359/569 |
| 2013/0083404 A1* | 4/2013 | Takagi | ............... | G02B 27/0101 359/633 |

FOREIGN PATENT DOCUMENTS

| | | | |
|---|---|---|---|
| JP | 02248918 A | * | 10/1990 |
| JP | H09-269405 A | | 10/1997 |
| JP | 2007-183444 A | | 7/2007 |
| JP | 4766913 B2 | | 9/2011 |

* cited by examiner

*Primary Examiner* — Thomas K Pham
*Assistant Examiner* — Vipin Patel
(74) *Attorney, Agent, or Firm* — Scully, Scott, Murphy & Presser, P.C.

(57) ABSTRACT

A first light blocking portion and a second light blocking portion are formed in at least one of the side surfaces of a light guide prism. The first light blocking portion and the second light blocking portion are arranged so that a shaded area and an invisible area overlap each other at least partly and cover an inter-groove area between the first light blocking portion and the second light blocking portion, where the shaded area is an area shadowed from image light due to the first light blocking portion, and the invisible area is an area invisible during virtual image observation by the observer due to the second light blocking portion.

9 Claims, 9 Drawing Sheets

VIRTUAL IMAGE OBSERVATION OPTICAL SYSTEM AND LIGHT GUIDE PRISM

CROSS-REFERENCE TO RELATED APPLICATION

The present application claims priority from Japanese Application No. 2014-047849, filed on Mar. 11, 2014, the content of which is incorporated herein by reference.

TECHNICAL FIELD

The present invention relates to a virtual image observation optical system for guiding image light from a display element to an observer's eyeball and displaying a virtual image of the display element within the observer's field of view, and a light guide prism used in the virtual image observation optical system.

BACKGROUND ART

As a display device for guiding image light emitted from a small-sized display element to an observer's eyeball and displaying a virtual image of the display element within the observer's field of view, a head-mountable, compact and lightweight device excellent in portability has been proposed (for example, see Patent Literature (PTL) 1). Such a display device employs a virtual image observation optical system using a light guide prism for guiding the image of the display element.

In the virtual image observation optical system using the light guide prism, part of light emitted from the display element tends to be reflected off a side surface of the light guide prism and cause a ghost image. A method of forming a groove having a V-shaped cross section (hereafter referred to as "V-shaped groove") in the side surface of the light guide prism is known to overcome this defect. To remove the ghost by the V-shaped groove, a method of forming successive V-shaped grooves in the side surface of the prism to remove the light (hereafter referred to as "ghost light") causing the ghost at all positions of the side surface is available (for example, see PTL 2). A method of forming a V-shaped groove only in one part of a flat side surface is known, too (for example, see PTL 3).

CITATION LIST

Patent Literature

PTL 1: Japanese Patent No. 4766913
PTL 2: Japanese Unexamined Patent Application Publication No. H9-269405
PTL 3: Japanese Unexamined Patent Application Publication No. 2007-183444

SUMMARY OF INVENTION

However, the method of forming successive V-shaped grooves in the side surface of the light guide prism has a problem in that, since the surface of the light guide prism has no flat part, the light guide prism cannot be brought into contact with and securely fixed to a flat part of a housing. Besides, forming V-shaped grooves in the entire side surface causes a problem in that a gate, an eject pin, and the like necessary for resin molding cannot be placed. It is also a problem that, when a gate portion by resin molding is located on the side surface of the light guide prism, the gate portion is visible to the observer. The gate for resin molding remains as a rough surface after molding. If light striking this part is visible, noise light such as flare light appears and degrades the performance of the optical system.

An invention of a virtual image observation optical system is a virtual image observation optical system for observing a virtual image of an image displayed by a display element, the virtual image observation optical system including: the display element; at least one light guide prism that guides image light from the display element; and an eyepiece that causes the guided image light to enter an observer's eyeball, wherein the at least one light guide prism has a first light blocking portion and a second light blocking portion in at least one side surface of side surfaces that surround a light path for guiding the image light from an incident surface to an exit surface of the light guide prism, and the first light blocking portion and the second light blocking portion are arranged so that a shaded area and an invisible area overlap each other at least partly and cover an intermediate area between the first light blocking portion and the second light blocking portion on the at least one side surface, where the shaded area is an area shadowed from the image light due to the first light blocking portion, and the invisible area is an area invisible during virtual image observation by the observer due to the second light blocking portion.

Preferably, when an interval between a vertex of the first light blocking portion and a vertex of the second light blocking portion in a direction parallel to an optical axis is denoted by M, $$s < M < s + h$$

$$s = a \times W_v / (P/2 + D/2 - a)$$

$$h = c \times L_2 / (P/2 + Q/2 - c)$$

where: the incident surface of the at least one light guide prism faces a display surface of the display element; D is a width of an effective display area of an image of the display element formed by an optical element between the display element and the first light blocking portion, in a direction perpendicular to the side surface in which the first light blocking portion and the second light blocking portion are formed; P is a width of the light guide prism between the side surface in which the first light blocking portion and the second light blocking portion are formed and a side surface facing the side surface, in a cross section perpendicular to the optical axis; $W_v$ is a distance between the first light blocking portion and the image of the display element as converted into a distance in the light guide prism; a is a height of the first light blocking portion from the side surface; c is a height of the second light blocking portion from the side surface; Q is a width of the eyepiece in the direction perpendicular to the side surface in which the first light blocking portion and the second light blocking portion are formed, in a development along the optical axis; and $L_2$ is a distance between the second light blocking portion and the eyepiece as converted into a distance in the light guide prism.

Alternatively, when an interval between a vertex of the first light blocking portion and a vertex of the second light blocking portion in a direction parallel to an optical axis is denoted by M, $$s < M < s + h$$

$$s = a \times W_v / (P/2 + D/2 - a)$$

$$h = c \times L_v/(P/2 + E - c)$$

where: the incident surface of the at least one light guide prism faces a display surface of the display element; D is a width of an effective display area of an image of the display element formed by an optical element between the display element and the first light blocking portion, in a direction perpendicular to the side surface in which the first light blocking portion and the second light blocking portion are formed; P is a width of the light guide prism between the side surface in which the first light blocking portion and the second light blocking portion are formed and a side surface facing the side surface, in a cross section perpendicular to the optical axis; $W_v$ is a distance between the first light blocking portion and the image of the display element as converted into a distance in the light guide prism; a is a height of the first light blocking portion from the side surface; c is a height of the second light blocking portion from the side surface; E is a radius of an image of the observer's pupil formed by an optical element between the second light blocking portion and the pupil; and $L_v$ is a distance between the second light blocking portion and the image of the pupil as converted into a distance in the light guide prism.

Preferably, the intermediate area is formed as a flat surface. A gate for resin injection may be placed in the intermediate area for molding the light guide prism. It is also preferable to form an attachment portion for fixing to a housing or a protrusion portion for positioning, in the intermediate area.

Moreover, at least one of the first light blocking portion and the second light blocking portion may be a groove. The first light blocking portion may be a notch or a light blocking portion provided at an outer edge of the incident surface of the light guide prism.

An invention of a light guide prism is a light guide prism used in a virtual image observation optical system for guiding image light from a display element to an observer's eyeball and displaying a virtual image of the display element within the observer's field of view, the light guide prism including: an incident surface and an exit surface for the image light; a plurality of side surfaces that surround a light path of the image light; and a first light blocking portion and a second light blocking portion formed in at least one side surface of the plurality of side surfaces, wherein the first light blocking portion and the second light blocking portion are arranged so that a shaded area and an invisible area overlap each other at least partly and cover an intermediate area between the first light blocking portion and the second light blocking portion on the at least one side surface, where the shaded area is an area shadowed from the image light due to the first light blocking portion, and the invisible area is an area invisible during virtual image observation by the observer due to the second light blocking portion.

BRIEF DESCRIPTION OF DRAWINGS

The present invention will be further described below with reference to the accompanying drawings, wherein.

DESCRIPTION OF EMBODIMENTS

The following describes embodiments of the present invention with reference to drawings.

Embodiment 1

Figure 1:
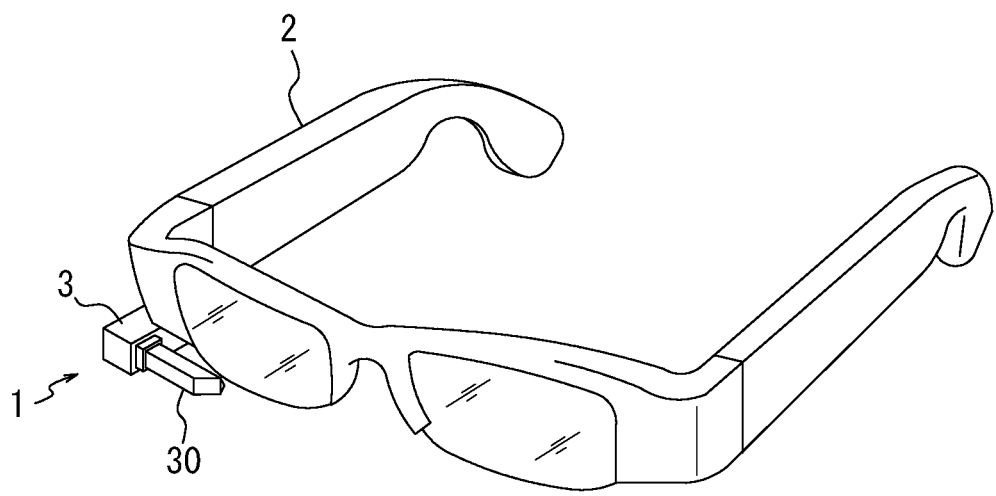
FIG. 1 is a perspective view of a display device using a virtual image observation optical system according to Embodiment 1.

FIG. 1 is a perspective view showing an example of a display device using a virtual image observation optical system according to Embodiment 1. A display device 1 includes: a support portion 2 (temples of glasses) shaped like glasses for fixedly supporting the whole display device 1 on an observer's head; a body portion 3 fixed to the support portion 2 and including a display element 20 (see FIG. 2); and a light guide prism 30 one end of which is supported by the body portion 3 and the other end of which extends to be in front of the observer's eye in a state where the display device 1 is worn by the observer. The body portion 3 includes, in addition to the display element 20, an electronic circuit for displaying an image on the display element 20, a communication function for receiving image data wiredly or wirelessly from outside the body portion 3, and the like.

Figure 2:
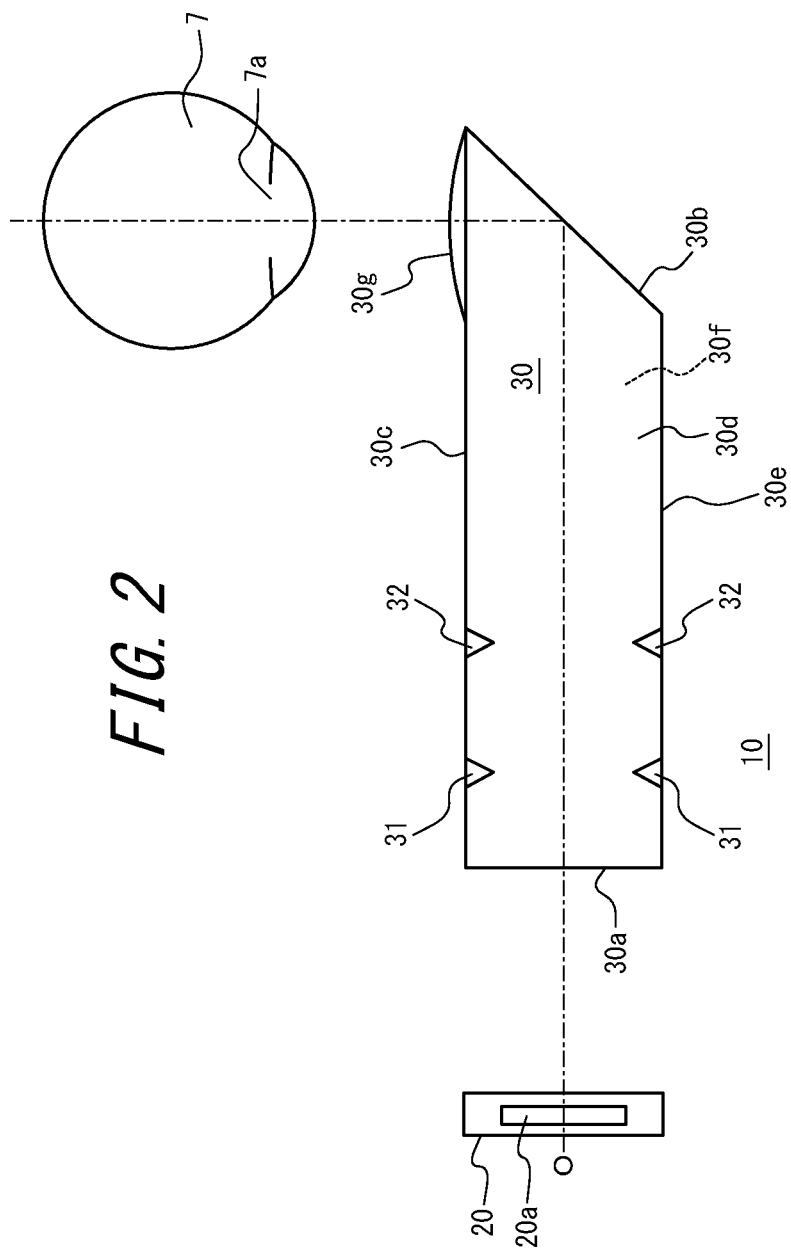
FIG. 2 is a schematic diagram showing the virtual image observation optical system according to Embodiment 1.
Figure 3:
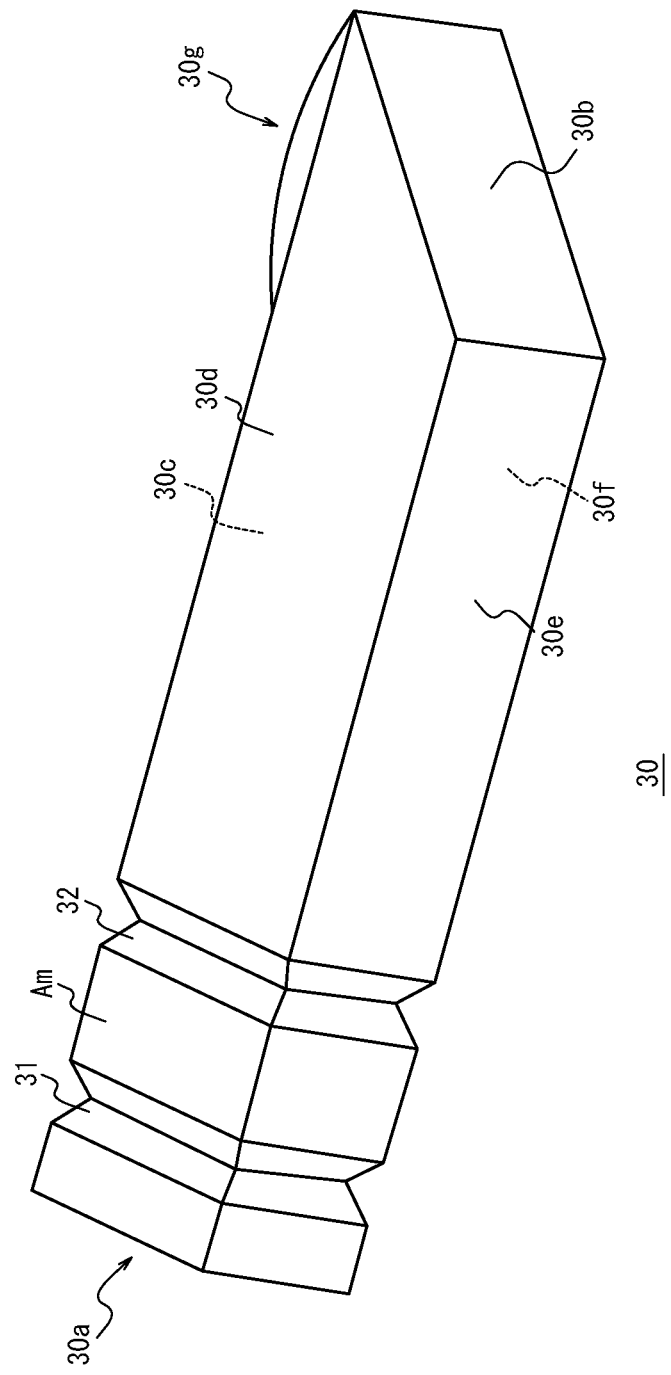
FIG. 3 is a perspective view of a light guide prism in FIG. 1.

FIG. 2 is a schematic diagram showing a virtual image observation optical system 10 according to Embodiment 1. FIG. 3 is a perspective view of the light guide prism 30. The virtual image observation optical system 10 includes the display element 20 and the light guide prism 30. The display element 20 is a liquid crystal display element, an organic EL element, or the like having a rectangular display surface 20a for displaying an image to be observed, and is included in the body portion 3.

The light guide prism 30 is a prism made of transparent resin and long in one direction, and has one end held in a housing of the body portion 3. The light guide prism 30 has an incident surface 30a and a reflection surface 30b at both ends in the longitudinal direction which is the image light optical axis direction. The incident surface 30a faces the display surface of the display element 20, inside the body portion 3. The reflection surface 30b is formed as a surface the internal surface of which is inclined at about 45° toward the observer when wearing the display device, with respect to the optical axis direction of the light guide prism 30. The reflection surface 30b preferably has no coating to satisfy the condition of total reflection for image light traveling in the light guide prism 30 in the optical axis direction, but may be formed as a mirror surface coated by aluminum sputtering or the like according to need.

The light guide prism 30 also has, between the incident surface 30a and the reflection surface 30b, a first side surface 30c, a second side surface 30d, a third side surface 30e, and a fourth side surface 30f so as to surround the path of image light. In the state where the observer wears the image display device 1, the first side surface 30c faces the observer's face, the second side surface 30d is the upper surface of the light guide prism 30, the third side surface 30e is opposite to the surface facing the observer's face, and the fourth side surface 30f is the lower surface of the light guide prism 30. In other words, the first side surface 30c and the third side surface 30e face each other, and the second side surface 30d and the fourth side surface 30f face each other.

The light guide prism 30 also has an exit surface 30g from which the image light reflected off the reflection surface 30b exits toward the observer's eyeball 7, at the end of the first side surface 30c opposite to the display element 20. The exit surface 30g is formed as a lens surface having positive refractive power, to display a virtual image of the display image of the display element 20 in the observer's sight. In this embodiment, the exit surface 30g of the light guide prism 30 constitutes an eyepiece. The exit surface 30g need not necessarily be on the same plane as the first side surface 30c, and may be inclined from the first side surface 30c to direct the optical axis toward the observer's eyeball 7. The optical axis O of the virtual image observation optical system 10 matches the optical axis of the lens of the exit surface 30g, and passes through the substantial center of the rectangular display surface 20a of the display element 20 and the incident surface 30a, bends at the substantial center of the reflection surface 30b, and passes through the exit surface 30g.

A first V-shaped groove 31 (first light blocking portion) and a second V-shaped groove 32 (second light blocking portion) are formed apart from each other in the direction of the optical axis O in a part of the light guide prism 30 covered with the housing of the body portion 3, so as to surround the side surfaces 30c to 30f. The first V-shaped groove 31 and the second V-shaped groove 32 are intended to prevent part of image light emitted from the display element 20 from reflecting off any side surface of the light guide prism 30 and entering the observer's eyeball 7 to thereby cause a ghost. By forming the grooves shaped like the letter V in the side surfaces of the light guide prism 30 near such positions where unwanted reflection occurs, ghost light caused by unwanted reflection can be blocked with the grooves functioning as a flare stop.

Figures 4A, 4B:
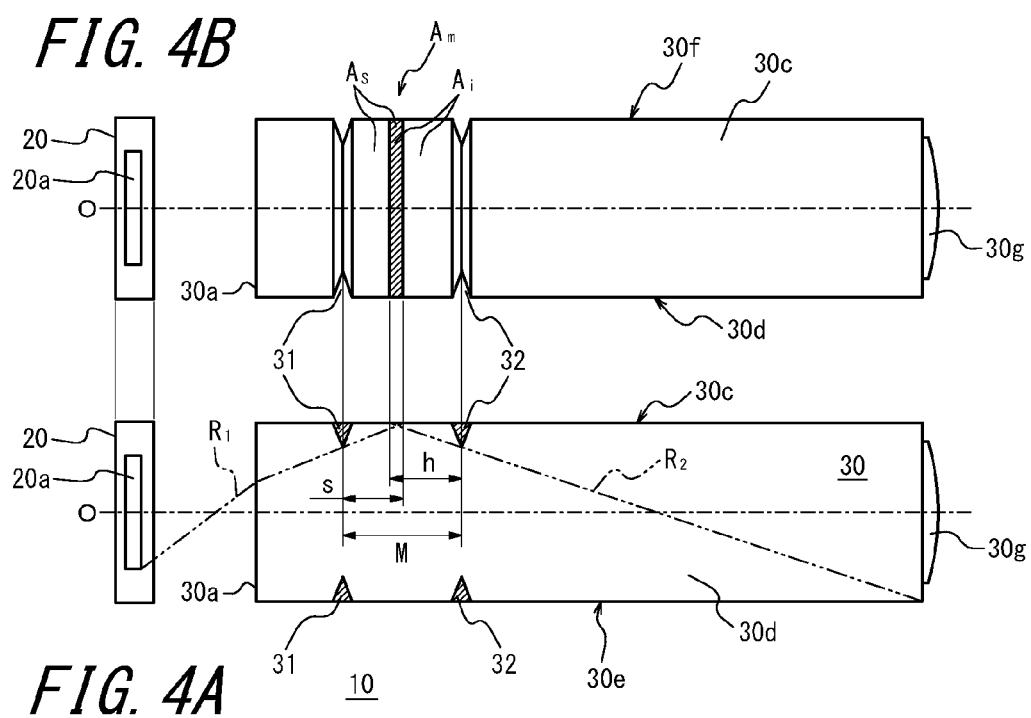
FIG. 4A is a sectional view showing the optical system in FIG. 2 linearly developed along its optical axis.
FIG. 4B is a side view showing the optical system in FIG. 2 linearly developed along its optical axis as seen from the direction perpendicular to the section in FIG. 4A

FIGS. 4A and 4B are diagrams showing the optical system in FIG. 2 linearly developed along the optical axis, where FIG. 4A is a sectional view and FIG. 4B is a side view as seen from the direction perpendicular to the section in FIG. 4A. FIGS. 4A and 4B show the optical system as a linear optical system by omitting the reflection by the reflection surface 30b, for the purpose of illustration.

In FIG. 4A, $R_1$ is the most inclined ray of light emitted from the display surface 20a of the display element 20 and passing through the vertex of the first V-shaped groove 31. The part between the ray of light $R_1$ and the first V-shaped groove 31 on the first side surface 30c is a shaded area $A_s$ shadowed from the image light from the display element 20. Meanwhile, $R_2$ is the most inclined line of sight traced backward from the eyepiece and passing through the vertex of the second V-shaped groove 32. The part between the line of sight $R_2$ and the second V-shaped groove 32 on the first side surface 30c is an invisible area $A_i$ not visible from the exit surface 30g (eyepiece) (i.e. not visible from the observer). Part of the shaded area $A_s$ is a visible area, but is substantially invisible because it is not exposed to light from the display element 20.

As shown in FIG. 4B, the part between the first groove 31 and the second groove 32 on the first side surface 30c is covered with the shaded area $A_s$ and the invisible area $A_i$, and the shaded area $A_s$ and the invisible area $A_i$ overlap each other in the hatched part in FIG. 4B. By making an inter-groove area $A_m$ (intermediate area) between the first V-shaped groove 31 and the second V-shaped groove 32 on the first side surface 30c wider than each of the shaded area $A_s$ and the invisible area $A_i$ and also making the shaded area $A_s$ and the invisible area $A_i$ partly overlap each other, a wide flat surface part that is substantially invisible can be secured.

Figure 5:
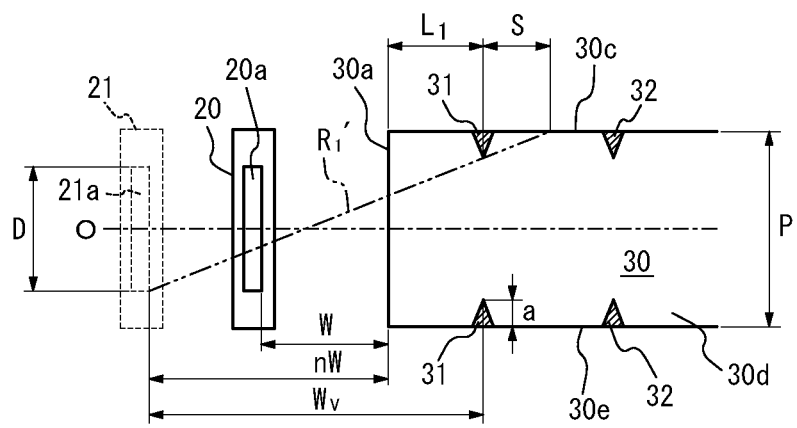
FIG. 5 is a diagram for describing a range of a width s of a shaded area $A_s$ in FIG. 4B.

The shaded area $A_s$ and the invisible area $A_i$ are mathematically expressed as follows. FIG. 5 is a diagram for describing the width s of the shaded area $A_s$ in FIG. 4B. Though the following description concerns the first V-shaped groove 31 formed in the first side surface 30c, the same applies to the second side surface 30d to the fourth side surface 30f. The light guide prism 30 is situated at a distance W from the display element 20. When light emitted from the display surface 20a of the display element 20 enters the light guide prism 30, the light is refracted due to the difference in refractive index between the air and the light guide prism 30. Accordingly, a virtual display element 21 is shown in FIG. 5 to facilitate understanding of the relationship between the display element 20, the light guide prism 30, and the ray of light emitted from the display element 20 and entering the light guide prism 30. The display position of the virtual display element 21 is at a distance nW from the incident surface 30a of the light guide prism 30, where the light path length is equal when the air layer is converted into the same medium as the light guide prism 30. Here, n is the refractive index of the light guide prism 30, and $R_1'$ is the path of a virtual ray of light emitted from the virtual display element 21.

In FIG. 5, based on the effect of the first V-shaped groove 31, let s be the width (the width of the shaded area $A_s$) from the vertex of the first V-shaped groove 31 to the exit surface 30g-side end of the shaded area $A_s$, D be the width of the effective display area (display surface 21a) of the virtual display element 21 in the direction perpendicular to the first side surface 30c, P be the width of the light guide prism 30 between the first side surface 30c and the third side surface 30e in the cross section perpendicular to the optical axis O, a be the height of the vertex of the first V-shaped groove 31 from the first side surface 30c, and $L_1$ be the distance of the vertex of the first V-shaped groove 31 from the incident surface 30a in the optical axis direction. The following expression then holds true:

$$(P/2+D/2-a)/(nW+L_1)=a/s \tag{1}$$

where $nW+L_1$ is the distance between the first V-shaped groove 31 and the display element image 21 in the optical axis direction as converted into the distance in the light guide prism, and is denoted by $W_v$. The width s of the shaded area $A_s$ is accordingly given by the following expression:

$$s = a \times W_v/(P/2 + D/2 - a) \quad (2).$$

Figure 6:
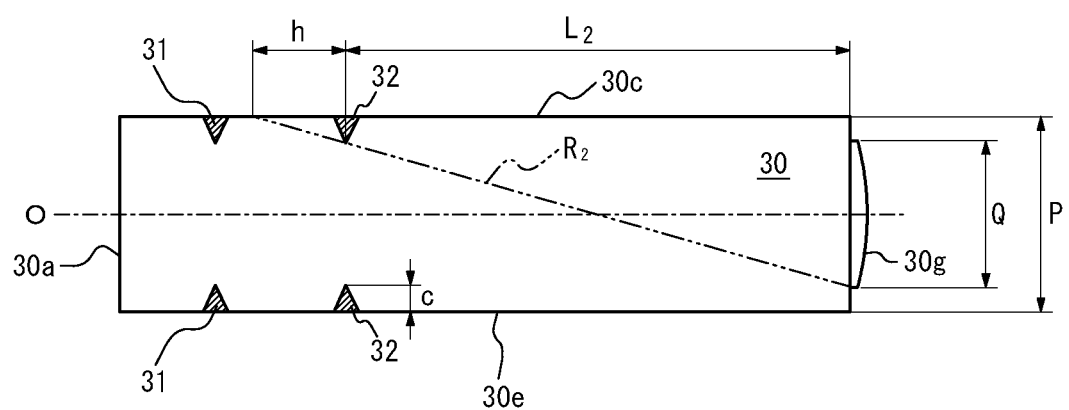
FIG. 6 is a diagram for describing a range of a width h of an invisible area $A_i$ in FIG. 4B.

FIG. 6 is a diagram for describing the width h of the invisible area $A_i$ in FIG. 4B. Let the width Q of the exit surface 30g in the direction perpendicular to the first side surface 30c be less than the width P of the light guide prism 30 in the same direction. Also let c be the height of the second V-shaped groove 32 from the first side surface 30c, $L_2$ be the distance from the vertex of the second V-shaped groove 32 to the exit surface 30g in the optical axis direction, and h be the width (the width of the invisible area $A_i$) from the vertex of the second V-shaped groove 32 to the incident surface 30a-side end of the invisible area $A_i$. The following expression then holds true:

$$(P/2 + Q/2 - c)/L_2 = c/h \quad (3).$$

The width h of the area (invisible area) not visible from the exit surface 30g is accordingly given by the following expression:

$$h = c \times L_2/(P/2 + Q/2 - c) \quad (4).$$

The light guide prism 30 is configured to satisfy the following expression:

$$s < M \leq s + h \quad (5)$$

where M is the width between the vertex of the first V-shaped groove 31 and the vertex of the second V-shaped groove 32 in the direction of the optical axis O. In the case where a plurality of V-shaped grooves are formed in the light guide prism, a typical arrangement method is to arrange the V-shaped grooves at such intervals that make the shaded areas $A_s$ of the respective V-shaped grooves overlap each other. In this embodiment, the left inequality in Expression (5), i.e. the greater width M of the inter-groove area $A_m$ than the width s of the shaded area $A_s$, means that the wider inter-groove area $A_m$ can be secured exceeding the width s of the shaded area $A_s$ formed by the display element 20 and the first V-shaped groove 31. Moreover, the right inequality means that the shaded area $A_s$ and the invisible area $A_i$ overlap each other at least partly in the inter-groove area $A_m$, so that the inter-groove area $A_m$ between the first V-shaped groove 31 and the second V-shaped groove 32 on the first side surface 30c is completely covered with the shaded area $A_s$ and the invisible area $A_i$.

With the above-mentioned structure of the virtual image observation optical system 10 and the light guide prism 30 used in the virtual image observation optical system 10, the light guide prism 30 has the continuous flat inter-groove area $A_m$ that is relatively wide. This area can be used as a flat surface for fixing the light guide prism 30 in the body portion 3.

In addition, the inter-groove area $A_m$ of the light guide prism 30 does not contribute to the light guide of a normal imaging luminous flux for forming a virtual image, and light resulting in ghost light either is blocked by the first V-shaped groove 31 and does not enter the inter-groove area $A_m$ or, even if reflected in this area, is invisible from the exit surface 30g due to the second V-shaped groove 32. Hence, the inter-groove area $A_m$ does not need to be a surface excellent in optical property. In other words, even when the surface has low flatness or the material around this surface is of uneven quality, the performance of the virtual image observation optical system 10 is affected little. The inter-groove area $A_m$ can therefore be put to various uses as described below.

Figure 7:
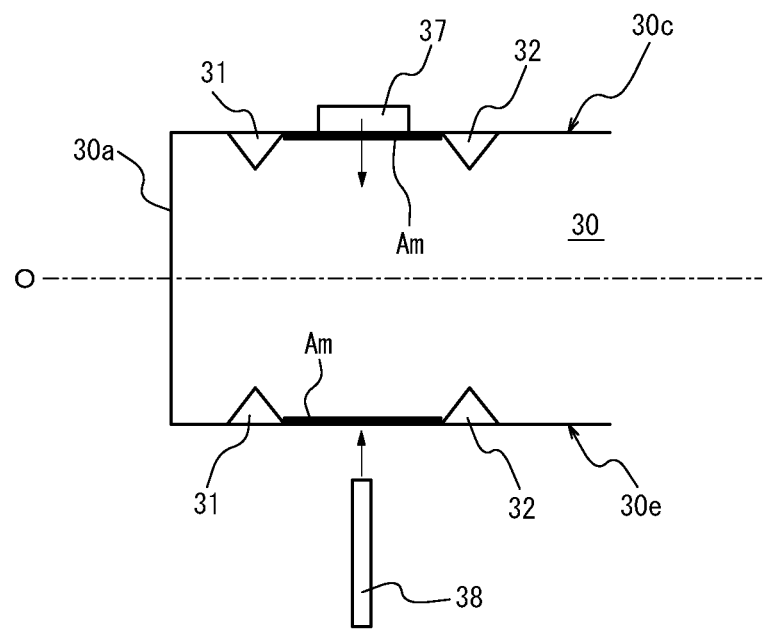
FIG. 7 is a diagram showing arrangement of a projection position by a gate and an eject pin in injection molding of the light guide prism.

For example, in the case of molding the light guide prism 30 by injection molding, a gate and an eject pin can be arranged in the part corresponding to the inter-groove area $A_m$. FIG. 7 is a diagram showing arrangement of a projection position by a gate 37 and an eject pin 38 in injection molding of the light guide prism 30. Upon injection molding, molten resin is injected from the gate 37 into a mold having a cavity in the shape of the light guide prism 30. The gate 37 is cut off when removed from the mold after injection molding. The cut surface is rougher than the other surfaces, and also the injected material tends to be of uneven quality near the gate 37. Moreover, in resin molding, the eject pin 38 is used to remove the molded light guide prism 30 from the mold. In the surface subjected to extrusion by the eject pin 38, a depression or a contour mark of the eject pin 38 tends to remain due to pressure applied through the eject pin 38. By arranging the projection position by the gate 37 and the eject pin 38 in injection molding in the inter-groove area $A_m$ of the light guide prism 30, molding can be performed without affecting the optical performance of the light guide prism 30 manufactured.

Figure 8:
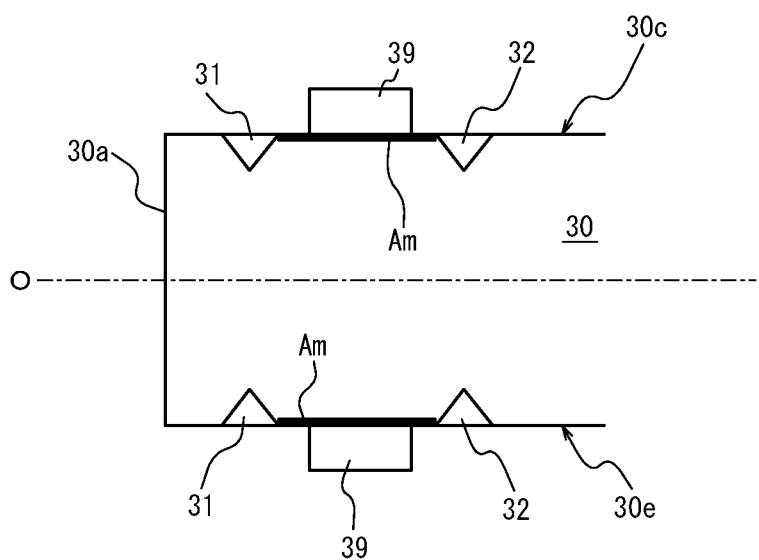
FIG. 8 is a sectional view of the light guide prism having a positioning protrusion.

A protrusion that is mated to the housing of the body portion 3 may be provided in the inter-groove area $A_m$, to accurately position the light guide prism 30 in the body portion 3. FIG. 8 is a simplified sectional view of the light guide prism 30 having a positioning protrusion 39. The positioning protrusion 39 may be placed only on the first side surface 30c, or a plurality of positioning protrusions 39 may be placed in the inter-groove area $A_m$ of the first side surface 30c to the fourth side surface 30f. Various other arrangements are also possible. When the positioning protrusion 39 is situated in an area where unwanted light such as ghost light passes through, there is a possibility that the light is scattered due to reflection at an edge of the protrusion and the like. When the protrusion is formed in the inter-groove area $A_m$, however, such scattering does not occur in the shaded area $A_s$. Besides, even if light is scattered in the invisible area $A_i$, it does not enter the observer's eyeball. The optical property of the light guide prism 30 is therefore unaffected. The gate 37 for injection molding may be placed above the positioning protrusion 39 in FIG. 8.

As described above, according to this embodiment, the wide, flat inter-groove area $A_m$ can be secured on the side surface of the light guide prism 30, so that the light guide prism 30 can be fixed by holding the inter-groove area $A_m$. The inter-groove area $A_m$ does not affect the optical performance of the light guide prism 30, and therefore can be used for manufacturing or holding of the light guide prism 30.

Figure 9A:
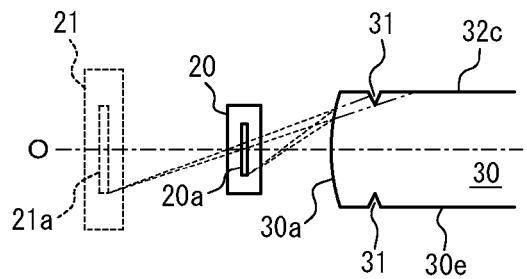
FIG. 9A is a diagram for describing blocking of ghost light by absorption by a first V-shaped groove.
Figure 9B:
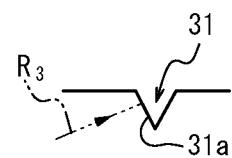
FIG. 9B is an enlarged view of the first V-shaped groove portion in FIG. 9A.

As the method for blocking ghost light by the first V-shaped groove 31 and the second V-shaped groove 32, a method of absorbing the light by the inclined surface of the V-shaped groove and a method of letting the light escape to the outside of the light guide prism 30 by reflection are available. The following describes the respective cases using modifications shown in FIGS. 9 and 10. FIG. 9A is a diagram for describing blocking of ghost light by absorption by the first V-shaped groove 31, and FIG. 9B is an enlarged view of the first V-shaped groove 31 portion. The inclined surface of the first V-shaped groove 31 blocks light by a light blocking paint. Moreover, the incident surface 30a of the light guide prism 30 in this modification is a surface having positive refractive power. In such a case, the virtual display element 21 is larger than the actual display element 20. A ray of light $R_3$ emitted from the display element 20 is incident on the inclined surface of the first V-shaped groove 31 and is absorbed here.

Figure 10A:
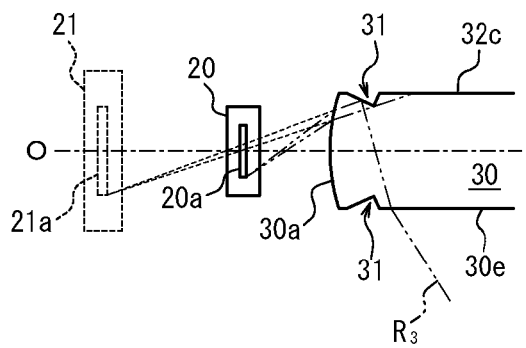
FIG. 10A is a diagram for describing blocking of ghost light by total reflection by the first V-shaped groove.
Figure 10B:
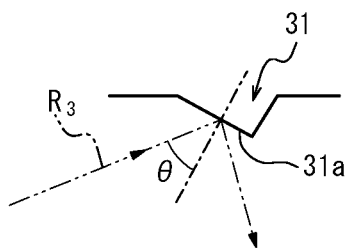
FIG. 10B is an enlarged view of the first V-shaped groove portion in FIG. 10A.

FIG. 10A is a diagram for describing blocking of ghost light by total reflection by the first V-shaped groove 31, and FIG. 10B is an enlarged view of the first V-shaped groove 31 portion. In this modification, too, the incident surface 30a of the light guide prism 30 is a surface having positive refractive power. A ray of light $R_3$ emitted from the display element 20 is totally reflected off the incident surface 30a-side inclined surface of the first V-shaped groove 31 formed in the first side surface 30c. The condition of total reflection here can be defined by the following expression using an incidence angle θ shown in FIG. 10B:

$$\theta > \sin^{-1}\left(\frac{1}{n}\right). \quad (6)$$

The reflected ray of light $R_3$ is incident on the third side surface 30e facing the first side surface 30c at a small incidence angle, and exits to the outside of the light guide prism 30. In such a case, the first V-shaped groove 31 need not be coated with the light blocking paint. This simplifies the manufacturing process, and also eliminates the possibility that the optical performance degrades due to peeling or the like of the light blocking paint.

Embodiment 2

Figure 11:
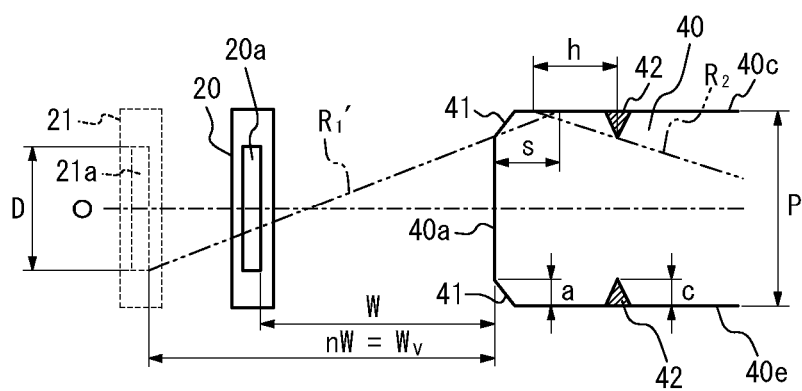
FIG. 11 is a schematic diagram showing a display element-side part of a virtual image observation optical system according to Embodiment 2.

The following describes a virtual image observation optical system 11 and a light guide prism 40 according to Embodiment 2 of the present invention. FIG. 11 is a schematic diagram showing a display element 20-side part of the virtual image observation optical system 11 according to Embodiment 2. Surfaces 40a to 40g of the light guide prism 40 in this embodiment respectively correspond to the surfaces 30a to 30g of the light guide prism 30 in Embodiment 1. In this embodiment, the corner between the incident surface 40a and each of the first side surface 40c to the fourth side surface 40f is notched and subjected to light blocking treatment to form a notch 41 (first light blocking portion), instead of the first V-shaped groove 31 in Embodiment 1. In addition, a V-shaped groove 42 (second light blocking portion) corresponding to the second V-shaped groove 32 in Embodiment 1 is formed in the first side surface 40c to the fourth side surface 40f, so as to surround the light guide prism 40. The other structure is the same as that in Embodiment 1.

Let W be the distance from the display surface of the display element 20 to the incident surface 40a of the light guide prism 40, n be the refractive index of the light guide prism 40, s be the width from the incident surface 40a to the exit surface 40g-side end of the shaded area $A_s$ not exposed to image light due to the notch 41, D be the width of the effective display area of the virtual display element 21 in the direction perpendicular to the first side surface 40c, P be the width of the light guide prism 40 between the first side surface 40c and the third side surface 40e in the cross section perpendicular to the optical axis O, and a be the height of the notch 41 from the first side surface 40c. The following expression then holds true:

$$(P/2+D/2-a)/nW=a/s \quad (7)$$

where nW is the distance between the notch 41 and the display element image 21 as converted into the distance in the light guide prism, and is denoted by $W_v$. The width s of the shaded area is accordingly given by the following expression:

$$s=a\times W_v/(P/2+D/2-a) \quad (8).$$

Let the width Q of the exit surface 40g in the direction perpendicular to the first side surface 40c be less than the width P of the light guide prism 40 in the direction perpendicular to the first side surface 40c. Also let c be the height of the V-shaped groove 42 from the first side surface 40c, $L_2$ be the distance from the vertex of the V-shaped groove 42 to the exit surface 40g in the light guide prism 40 in the optical axis direction, and h be the width (the width of the invisible area $A_i$) from the vertex of the V-shaped groove 42 to the incident surface 40a-side end of the invisible area $A_i$. The same Expressions (3) and (4) as in Embodiment 1 then hold true for the invisible area $A_i$.

Let M be the width of the area $A_m$ (intermediate area) between the notch 41 and the vertex of the V-shaped groove 42 in the direction of the optical axis O. The width M is set to satisfy Expression (5) as in Embodiment 1. Instead of the notch 41, the outer peripheral edges of the flat incident surface 40a of the light guide prism 40 may be coated with a light blocking film, or the outer peripheral edges of the incident surface 40a may be covered with a light blocking member. In such a case, the part shielded from light by the light blocking film or the light blocking member has the height a from the first side surface 40c.

According to this embodiment, the wide, flat inter-groove area $A_m$ not affecting the optical performance of the light guide prism 40 can be secured on the side surface of the light guide prism 40 as in Embodiment 1, thus achieving the same advantageous effects as in Embodiment 1. Further, the provision of the notch 41 instead of the first V-shaped groove eases the molding and the light blocking treatment, as compared with Embodiment 1.

Embodiment 3

Figure 12:
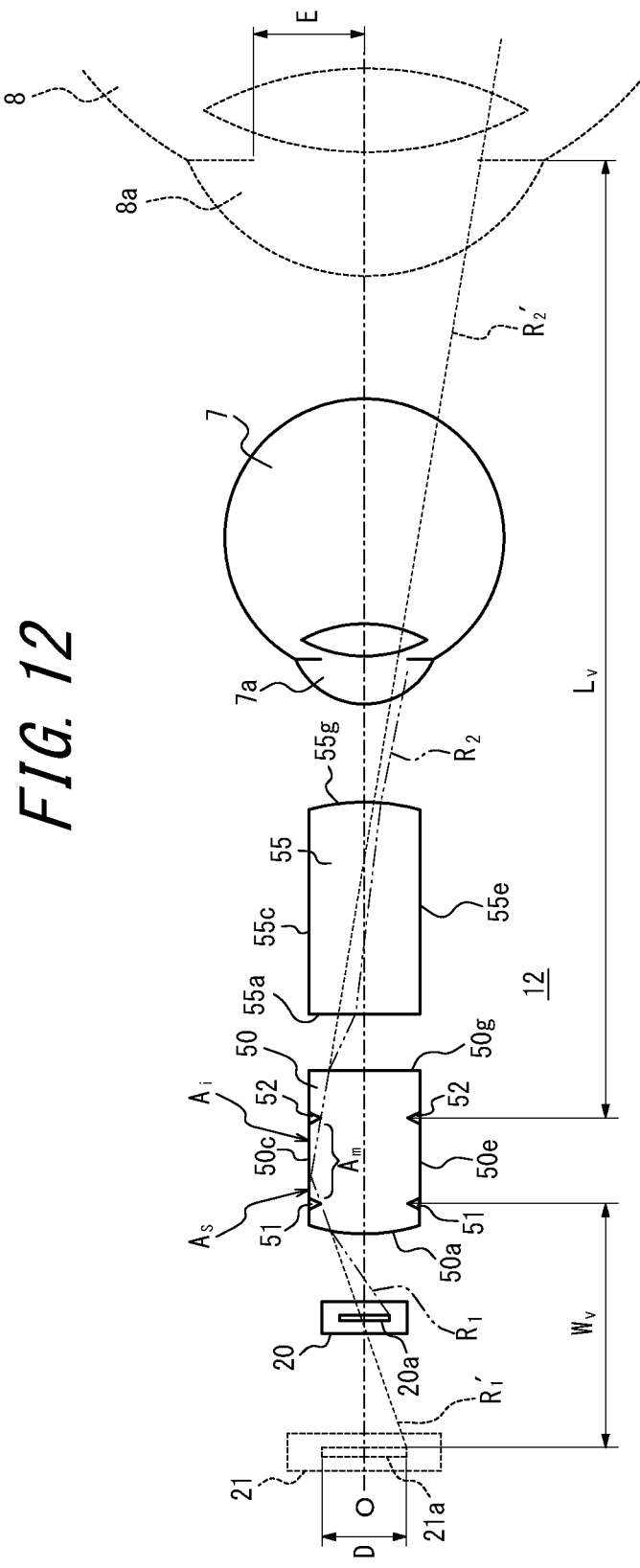
FIG. 12 is a schematic diagram showing a virtual image observation optical system according to Embodiment 3 linearly developed along its optical axis.

FIG. 12 is a schematic diagram showing a virtual image observation optical system 12 according to Embodiment 3 linearly developed along the optical axis O. The virtual image observation optical system 12 differs from those in Embodiments 1 and 2 in that it includes two light guide prisms, namely, a first light guide prism 50 and a second light guide prism 55, in addition to the display element 20. The following describes the structure of the virtual image observation optical system 12 with reference to the drawing.

The first light guide prism 50 is a hexahedral prism having an incident surface 50a, an exit surface 50g, and a first side surface 50c to a fourth side surface 50f arranged between the incident surface 50a and the exit surface 50g so as to surround the path of image light. The first light guide prism 50 does not have a reflection surface for bending the light path like the reflection surface 30b of the light guide prism 30 in Embodiment 1, and the incident surface 50a and the exit surface 50g face each other. The incident surface 50a is a lens surface having positive refractive power, and the exit surface 50g is a flat surface. A first V-shaped groove 51 (first light blocking portion) and a second V-shaped groove 52 (second light blocking portion) are formed in the first side surface 50c to the fourth guide surface 50f of the first light guide prism 50, so as to surround the side surfaces of the light guide prism 50.

The second light guide prism 55 is a hexahedral prism having an incident surface 55a, a reflection surface (not shown) for bending the path of image light by about 90°, and a first side surface 55c to a fourth side surface 55f arranged between the incident surface 55a and the reflection surface so as to surround the path of image light (only the first side surface 55c and the third side surface 55e are shown in FIG. 12). The first side surface 55c is provided with an exit surface 55g from which the image light exits toward the eyeball 7. The exit surface 55g is a lens surface having positive refractive power. The exit surface 55g is an eyepiece in this embodiment.

The display element 20, the first light guide prism 50, and the second light guide prism 55 are arranged with the exit surface 50g of the first light guide prism 50 and the incident surface 55a of the second light guide prism 55 facing each other at a predetermined interval apart. Here, the first light guide prism 50 and the second light guide prism 55 are arranged so that, in the developed virtual image observation optical system 12 in FIG. 12, the incident surface 50a of the first light guide prism 50 having positive refractive power and the exit surface 55g of the second light guide prism 55 have the matching optical axis O and this optical axis O passes through the substantial center of the display element 20, the incident surface 50a and exit surface 50g of the first light guide prism 50, and the incident surface 55a and exit surface 55g of the second light guide prism 55.

The display element 20, the first light guide prism 50, and the second light guide prism 55 are each held to the body portion 3 by a holding mechanism not shown, and are positioned relative to each other. Light is blocked between the exit surface 50g of the first light guide prism 50 and the incident surface 55a of the second light guide prism 55 so as to prevent incidence of outside light.

A ray of light $R_1$ in FIG. 12 is the most inclined ray of light emitted from the display element 20 and passing through the vertex of the first V-shaped groove 51 (first light blocking portion), as in Embodiment 1. In this embodiment, however, the incident surface 50a has refractive power, and so the ray of light $R_1$ is bent at the incident surface 50a. In FIG. 12, the virtual display element 21 represents the image of the display element 20 (the virtual image of the display element) formed by the optical element (i.e. the light guide prism 50 and its incident surface 50a) from the display element 20 to the first V-shaped groove 51, at the position as converted into the distance in the light guide prism. Suppose a straight line is drawn as a virtual ray of light $R_1'$ from the outer edge of the effective area of the virtual display element 21 through the vertex of the first V-shaped groove 51. The part between the first V-shaped groove 51 and the point of intersection of the ray of light $R_1'$ with the first side surface 50c is the shaded area $A_s$ not exposed to image light from the display element 20. In this case, too, the width s of the shaded area $A_s$ can be calculated by Expression (2), using the distance $W_v$ between the first V-shaped groove 51 and the virtual display element image 21 as converted into the distance in the light guide prism.

Meanwhile, $R_2$ is the most inclined line of sight traced backward from the pupil 7a of the eyeball 7 and passing through the vertex of the second V-shaped groove 52 (second light blocking portion). The part between the point of intersection of the line of sight $R_2$ with the first side surface 50c and the second V-shaped groove 52 is the invisible area $A_i$ not visible from the exit surface 55g (eyepiece). The difference from Embodiment 1 lies in that the starting point from which the line of sight $R_2$ for determining the invisible area $A_i$ is traced backward is not the exit surface 55g of the second light guide prism 55 but the observer's pupil 7a. In the case where the diameter of the observer's pupil is less than the width of the second light guide prism 55, the inclination of the line of sight $R_2$ is more gentle, which increases the width of the invisible area $A_i$ as compared with the case where the line of sight $R_2$ is drawn with the outermost edge of the exit surface 55g as the starting point.

Since the exit surface 55g has refractive power, the line of sight $R_2$ is bent at the exit surface 55g. In FIG. 12, a virtual eyeball 8 of the user represents the image (virtual image) of the eyeball 7 formed by the optical element (i.e. the second light guide prism 55 and the exit surface 50g side of the second V-shaped groove 52 of the first light guide prism 50) from the eyeball 7 to the second V-shaped groove 52, at the position as converted into the distance in the light guide prisms 50 and 55. Suppose a virtual line of sight $R_2'$ from the outer edge of the pupil 8a of the virtual eyeball 8 through the vertex of the second V-shaped groove 52 is drawn. The part between the second V-shaped groove 52 and the point of intersection of the line of sight $R_2'$ with the first side surface 50c is the invisible area $A_i$.

Let E be the radius of the pupil image 8a formed by the optical element between the second V-shaped groove 52 and the observer's pupil 7a, and $L_v$ be the distance between the second V-shaped groove 52 and the pupil image 8a as converted into the distance in the light guide prisms 50 and 55. The following expression then holds true:

$$h = c \times L_v / (P/2 + E - c) \qquad (9).$$

By applying h obtained according to Expression (9) to the condition of Expression (5) together with s obtained according to Expression (2), the width of the inter-groove area $A_m$ between the first V-shaped groove 51 and the second V-shaped groove 52 in the direction of the optical axis O can be set wide in the range where the shaded area $A_s$ and the invisible area $A_i$ overlap each other at least partly.

The shaded area $A_s$ and the invisible area $A_i$ formed on the first side surface 50c of the first light guide prism 50 in this embodiment partly overlap each other as in Embodiment 1. Accordingly, the wide inter-groove area $A_m$ not affecting the optical performance of the first light guide prism 50 can be secured, thus achieving the same advantageous effects as in Embodiment 1. Moreover, the invisible area $A_i$ is designed not based on the outer edge of the exit surface 55g of the light guide prism but based on the line of sight $R_2$ passing through the observer's pupil 7a, as compared with the light guide prism in Embodiment 1. This further widens the invisible area $A_i$, enabling the wider inter-groove area $A_m$ to be secured.

Embodiment 4

Figure 13:
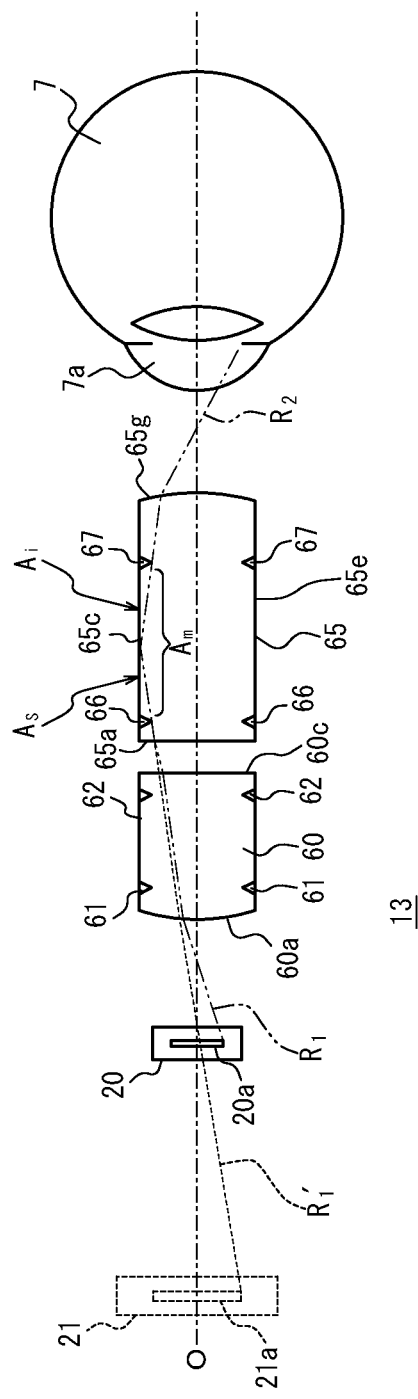
FIG. 13 is a schematic diagram showing a virtual image observation optical system according to Embodiment 4 linearly developed along its optical axis.

FIG. 13 is a schematic diagram showing a virtual image observation optical system 13 according to Embodiment 4 linearly developed along the optical axis O. The virtual image observation optical system 13 includes a first light guide prism 60 and a second light guide prism 65. In the same structure as in Embodiment 3, a first V-shaped groove 66 (first light blocking portion) and a second V-shaped groove 67 (second light blocking portion) are formed in the second light guide prism 65, in addition to the first light guide prism 60. Each component in the first light guide prism 60 and the second light guide prism 65 is given a reference numeral obtained by adding 10 to the reference numeral of the corresponding component in Embodiment 3.

As shown in FIG. 13, side surfaces 65c of the second light guide prism 65 have the shaded area $A_s$ shadowed from the image light from the display element 20 due to the first V-shaped groove 66 and the invisible area $A_i$ invisible during virtual image observation by the observer due to the second V-shaped groove 67. The shaded area $A_s$ and the invisible area $A_i$ overlap each other at least partly, and cover the inter-groove area $A_m$ between the first V-shaped groove 66 and the second V-shaped groove 67 on the first side surface 65c.

Thus, the wide inter-groove area $A_m$ not affecting the optical performance of the light guide prism can be secured not only on the first light guide prism 60 but also on the second light guide prism 65. The second light guide prism 65 can be fixed by holding the inter-groove area $A_m$, too. The inter-groove area $A_m$ does not affect the optical performance of the light guide prism 65, and so can be used as the arrangement position of a gate and an eject pin during manufacture and used for holding or positioning.

Note that the present invention is not limited to the foregoing embodiments, and various modifications and changes are possible. For example, though the illustrated display device is shaped like glasses, the display device to which the virtual image observation optical system and the light guide prism according to the present invention are applicable is not limited to this. The display device may have any of various shapes such as goggles and a helmet, so long as it can be fixed to the user's head. Besides, the light guide prism is not limited to a structure that is horizontally long during use. For example, a vertically long light guide prism may be used with the display element being located in front of the head. Though each of the foregoing embodiments describes a virtual image observation optical system and a light guide prism for the right eye, the present invention is equally applicable to the left eye.

Though each of the foregoing embodiments describes the case where the first light blocking portion and the second light blocking portion are arranged along each surface of the light guide prism so as to surround the light guide prism, the arrangement of the first light blocking portion and the second light blocking portion is not limited to this. For example, the first light blocking portion and the second light blocking portion may be formed in two facing side surfaces of the light guide prism. Alternatively, the first light blocking portion and the second light blocking portion may be formed in one side surface or three side surfaces. Moreover, the virtual image observation optical system is not limited to the structure of including one or two light guide prisms, and may include three or more light guide prisms. Though Embodiment 2 describes the structure in which a notch or a light blocking portion is formed in the incident surface of the light guide prism, a notch or a light blocking portion may be formed in the exit surface of the light guide prism as a second light blocking portion. Though the above describes an example where the width of the eyepiece is less than the width of the light guide prism, the width of the eyepiece may be equal to the width of the light guide prism.

REFERENCE SIGNS LIST

- 1 display device
- 2 glasses
- 3 body portion
- 7 eyeball
- 10 virtual image observation optical system
- 20 display element
- 21 virtual display element
- 30, 40 light guide prism
- 31, 51, 61, 66 first V-shaped groove (first light blocking portion)
- 32, 52, 62, 67 second V-shaped groove (second light blocking portion)
- 37 gate
- 38 eject pin
- 39 positioning protrusion
- 41 notch (first light blocking portion)
- 42 V-shaped groove (second light blocking portion)
- 50, 60 first light guide prism
- 55, 65 second light guide prism
- $A_m$ inter-groove area
- $A_s$ shaded area
- $A_i$ invisible area

The invention claimed is:

1. A virtual image observation optical system for observing a virtual image of an image displayed by a display element, the virtual image observation optical system comprising:
   the display element;
   at least one light guide prism that guides image light from the display element;
   and an eyepiece that causes the guided image light to enter an observer's eyeball, wherein the at least one light guide prism has a first light blocking portion and a second light blocking portion in at least one side surface of side surfaces that surround a light path for guiding the image light from an incident surface to an exit surface of the light guide prism, and
   the first light blocking portion and the second light blocking portion are arranged so that a shaded surface and an invisible surface overlap each other at least partly and cover an intermediate surface between the first light blocking portion and the second light blocking portion on the at least one side surface, where the shaded surface is on the intermediate surface on the at least one side surface shadowed from the image light due to the first light blocking portion, and the invisible surface is on the intermediate surface on the at least one side surface invisible during virtual image observation by the observer due to the second light blocking portion.

2. The virtual image observation optical system according to claim 1, wherein
   when an interval between a vertex of the first light blocking portion and a vertex of the second light blocking portion in a direction parallel to an optical axis is denoted by M, $$s<M<s+h$$

$$s=a\times W_v/(P/2+D/2-a)$$

$$h=c\times L_2/(P/2+Q/2-c)$$

where: the incident surface of the at least one light guide prism faces a display surface of the display element; D is a width of an effective display area of an image of the display element formed by an optical element between the display element and the first light blocking portion, in a direction perpendicular to the side surface in which the first light blocking portion and the second light blocking portion are formed; P is a width of the light guide prism between the side surface in which the first light blocking portion and the second light blocking portion are formed and a side surface facing the side surface, in a cross section perpendicular to the optical axis; $W_v$ is a distance between the first light blocking portion and the image of the display element as converted into a distance in the light guide prism; a is a height of the first light blocking portion from the side surface; c is a height of the second light blocking portion from the side surface; Q is a width of the eyepiece in the direction perpendicular to the side surface in which the first light blocking portion and the second light blocking portion are formed, in a development along the optical axis; and $L_2$ is a distance between the second light blocking portion and the eyepiece as converted into a distance in the light guide prism.

3. The virtual image observation optical system according to claim 1,
wherein when an interval between a vertex of the first light blocking portion and a vertex of the second light blocking portion in a direction parallel to an optical axis is denoted by M, $s<M<s+h$ $s=a\times W_v/(P/2+D/2-a)$ $h=c\times L_v/(P/2+E-c)$ where: the incident surface of the at least one light guide prism faces a display surface of the display element; D is a width of an effective display area of an image of the display element formed by an optical element between the display element and the first light blocking portion, in a direction perpendicular to the side surface in which the first light blocking portion and the second light blocking portion are formed; P is a width of the light guide prism between the side surface in which the first light blocking portion and the second light blocking portion are formed and a side surface facing the side surface, in a cross section perpendicular to the optical axis; $W_v$ is a distance between the first light blocking portion and the image of the display element as converted into a distance in the light guide prism; a is a height of the first light blocking portion from the side surface; c is a height of the second light blocking portion from the side surface; E is a radius of an image of the observer's pupil formed by an optical element between the second light blocking portion and the pupil; and $L_v$ is a distance between the second light blocking portion and the image of the pupil as converted into a distance in the light guide prism.

4. The virtual image observation optical system according to claim 1, wherein the intermediate surface is formed as a flat surface.

5. The virtual image observation optical system according to claim 1, wherein a gate for resin injection is placed in the intermediate surface for molding.

6. The virtual image observation optical system according to claim 1, wherein an attachment portion for fixing to a housing or a protrusion portion for positioning is formed in the intermediate surface.

7. The virtual image observation optical system according to claim 1, wherein at least one of the first light blocking portion and the second light blocking portion is a groove.

8. The virtual image observation optical system according to claim 1, wherein the first light blocking portion is a notch or a light blocking portion provided at an outer edge of the incident surface of the light guide prism.

9. A light guide prism used in a virtual image observation optical system for guiding image light from a display element to an observer's eyeball and displaying a virtual image of the display element within the observer's field of view, the light guide prism comprising:
an incident surface and an exit surface for the image light;
a plurality of side surfaces that surround a light path of the image light; and
a first light blocking portion and a second light blocking portion formed in at least one side surface of the plurality of side surfaces,
wherein the first light blocking portion and the second light blocking portion are arranged so that a shaded surface and an invisible surface overlap each other at least partly and cover an intermediate surface between the first light blocking portion and the second light blocking portion on the at least one side surface, where the shaded surface is on the intermediate surface on the at least one side surface shadowed from the image light due to the first light blocking portion, and the invisible surface is on the intermediate surface on the at least one side surface invisible during virtual image observation by the observer due to the second light blocking portion.

* * * * *